(12) United States Patent
Okuhara (10) Patent No.: US 12,187,310 B2
(45) Date of Patent: Jan. 7, 2025

(54) VEHICLE CONTROL DEVICE, VEHICLE CONTROL METHOD, AND VEHICLE CONTROL SYSTEM

(71) Applicant: HITACHI ASTEMO, LTD., Hitachinaka (JP)

(72) Inventor: Yuki Okuhara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 351 days.

(21) Appl. No.: 17/435,909

(22) PCT Filed: Apr. 30, 2020

(86) PCT No.: PCT/JP2020/018218
§ 371 (c)(1),
(2) Date: Sep. 2, 2021

(87) PCT Pub. No.: WO2020/241167
PCT Pub. Date: Dec. 3, 2020

(65) Prior Publication Data
US 2022/0234606 A1 Jul. 28, 2022

(30) Foreign Application Priority Data

May 29, 2019 (JP) ................................. 2019-100370

(51) Int. Cl.
*B60W 50/16* (2020.01)
*B60W 10/04* (2006.01)
(Continued)

(52) U.S. Cl.
CPC ............ *B60W 50/16* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

2015/0251666 A1* 9/2015 Attard ................. B62D 15/029
701/23
2018/0088572 A1 3/2018 Uchida et al.
(Continued)

FOREIGN PATENT DOCUMENTS

JP 2012-208566 A 10/2012
JP 2016-137819 A 8/2016
(Continued)

OTHER PUBLICATIONS

International Search Report dated Jul. 28, 2020 issued in International Application No. PCT/JP2020/018218, with English translation, 5 pages.
(Continued)

*Primary Examiner* — Tamara L Weber
(74) *Attorney, Agent, or Firm* — FOLEY & LARDNER LLP (57) ABSTRACT

A vehicle control controller is configured to acquire information on an obstacle in front of a vehicle acquired by an external world recognition device, and to output, based on the acquired obstacle position and own vehicle position, a first notification command for controlling a notification unit so as to give to a driver a notification for urging the driver to avoid touching a steering wheel when transitioning to an autonomous emergency avoidance steering mode for avoiding the obstacle based on control by an electric power steering device.

12 Claims, 3 Drawing Sheets

(51) Int. Cl.
    *B60W 10/18*     (2012.01)
    *B60W 10/20*     (2006.01)
    *B60W 30/09*     (2012.01)
    *B60W 60/00*     (2020.01)
    *B60W 50/14*     (2020.01)

(52) U.S. Cl.
    CPC ........ *B60W 30/09* (2013.01); *B60W 60/0051* (2020.02); *B60W 2050/143* (2013.01); *B60W 2050/146* (2013.01); *B60W 2540/18* (2013.01); *B60W 2710/18* (2013.01); *B60W 2710/20* (2013.01)

(56) References Cited

U.S. PATENT DOCUMENTS

2018/0251066 A1*   9/2018   Murata ................ B60W 30/12
2018/0326996 A1   11/2018   Fujisawa et al.
2019/0061745 A1    2/2019   Hatano

FOREIGN PATENT DOCUMENTS

JP       2017-091170 A     5/2017
JP           6508846 B2     5/2019
WO    WO-2017/154070 A1   9/2017

OTHER PUBLICATIONS

Written Opinion of the International Searching Authority dated Jul. 28, 2020 issued in International Application No. PCT/JP2020/018218, with English translation, 8 pages.
Extended European Search Report dated Jun. 9, 2022 issued in EP Application No. 20812689.6, 8 pages.

* cited by examiner

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system.

BACKGROUND ART

In Patent Literature 1, there is disclosed a vehicle control device configured to perform autonomous emergency avoidance steering for avoiding an obstacle in preference to autonomous driving control in which a vehicle travels along a target travel path when there is a risk of colliding with an obstacle during the autonomous driving control.

CITATION LIST

Patent Literature

PTL 1: WO 2017/154070 A1

SUMMARY OF INVENTION

Technical Problem

However, in the technology disclosed in Patent Literature 1, although a driver is notified in advance of the execution of autonomous emergency avoidance steering, the autonomous emergency avoidance steering may be hindered when the driver touches a steering wheel while the autonomous emergency avoidance steering is being executed.

One object of the present invention is to provide a vehicle control device, a vehicle control method, and a vehicle control system which are capable of preventing a driver from interfering with autonomous emergency avoidance steering.

Solution to Problem

In a vehicle control device according to one embodiment of the present invention, a control unit is configured to output a first notification command for controlling a notification unit so as to give to a driver a notification for urging the driver to avoid touching a steering wheel when transitioning to an autonomous emergency avoidance steering mode.

Thus, according to one embodiment of the present invention, it is possible to prevent the driver from interfering with the autonomous emergency avoidance steering.

DESCRIPTION OF EMBODIMENTS

First Embodiment

Figure 1:
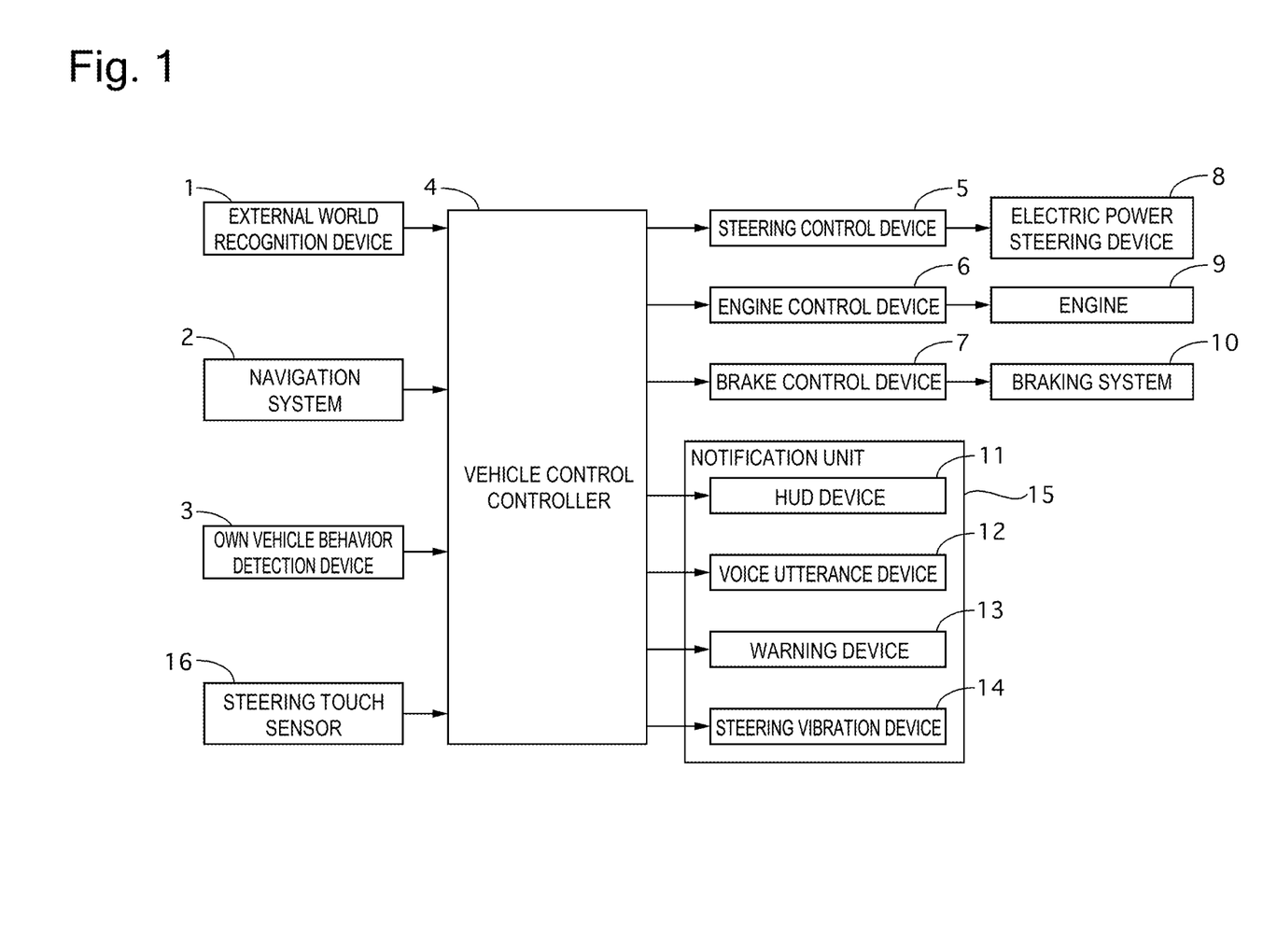
FIG. 1 is a configuration diagram of a vehicle control system according to a first embodiment of the present invention.

FIG. 1 is a configuration diagram of a vehicle control system according to a first embodiment of the present invention.

The vehicle control system of the first embodiment is mounted on a vehicle to be powered by an engine 9. An external world recognition device (external world recognition unit) 1 is configured to acquire a surrounding environment (for example, road shape and white lines) and a current position of the own vehicle as external world information from, for example, a camera, a laser radar, a global navigation satellite system (GNSS) receiver, and a map database mounted on the own vehicle (vehicle). A navigation system 2 is configured to set a target travel path from a current position of the own vehicle to a destination set by a driver, and to provide route guidance to the driver. An own vehicle behavior detection device 3 is configured to detect a behavior of the own vehicle based on various signals from, for example, a steering angle sensor configured to detect a steering angle of front wheels, a vehicle speed sensor configured to detect a vehicle speed, a lateral G sensor configured to detect a lateral G, a yaw rate sensor configured to detect a yaw rate, and turn signals. A vehicle control controller (control unit) 4 is configured to execute driving assist control when a predetermined driving assist start condition including selection of driving assist (for example, a driving assist selection button is turned ON) by the driver is satisfied.

The vehicle control controller 4 performs steering control and vehicle speed control such that, during driving assist control, the own vehicle travels autonomously based on the target travel path. Specifically, during driving assist control, the vehicle control controller 4 calculates a target steering angle of the front wheels in steering control and calculates a target vehicle speed of the own vehicle in vehicle speed control based on the surrounding environment of the own vehicle and the behavior of the own vehicle. A steering control device 5 is configured to drive an electric power steering device (steering actuator) 8 such that the steering angle of the front wheels becomes the target steering angle. A throttle control device 6 is configured to drive an engine (drive actuator) 9 such that the vehicle speed of the own vehicle becomes the target vehicle speed. A brake control device 7 is configured to drive a brake system (braking actuator) 10 such that the vehicle speed of the own vehicle becomes the target vehicle speed.

The vehicle control system of the first embodiment includes, as a notification unit 15 configured to notify the driver, a head-up display (HUD) device 11, a voice utterance device 12, a warning device 13, and a steering vibration device 14. The HUD device 11 is configured to display vehicle information on the vehicle speed, for example, and route guidance of the navigation system 2, for example, as a virtual image on a front window of the own vehicle. The voice utterance device 12 is configured to utter various warnings and the route guidance of the navigation system 2, for example, as synthesized speech. The warning device 13 is configured to emit warning sounds to issue various warnings. The steering vibration device 14 is configured to vibrate the steering wheel to give various warnings. Further, the vehicle control system includes a steering touch sensor 16. The steering touch sensor 16 is configured to detect whether or not the driver is holding the steering wheel.

The vehicle control controller 4 causes the driving assist control to transition to an autonomous emergency avoidance steering mode when it is determined during the driving assist control that there is a possibility of a collision with an obstacle in front and the collision may not be avoided by avoidance steering by the driver. In the autonomous emergency avoidance steering mode, the vehicle control controller 4 finds an escape zone to the left and the right of the obstacle in which no oncoming vehicles or following vehicles will come, sets a target travel path for the own vehicle to travel toward the escape zone, and drives the electric power steering device 8 such that the own vehicle autonomously travels along the target travel path. In a conventional steering device, the steering wheel and the (steering mechanism of the) front wheels are mechanically connected. Therefore, when autonomous emergency avoidance steering is executed while the driver is in contact with the steering wheel, the steering of the front wheels based on the drive of the electric power steering device 8 is hindered by the driver. In this case, the steering angle for achieving the target travel path is not obtained, and hence the avoidance of the obstacle may be hindered. Moreover, when the steering angle of the front wheels suddenly changes due to autonomous emergency avoidance steering, the steering wheel rotates at a relatively high speed, and hence the arms of the driver may get caught in the steering wheel or the fingers of the driver may come into violent contact with steering spokes.

Therefore, in the vehicle control system of the first embodiment, the vehicle control controller 4 executes the following driving assist control in order to solve the above-mentioned problems.

Figure 2:
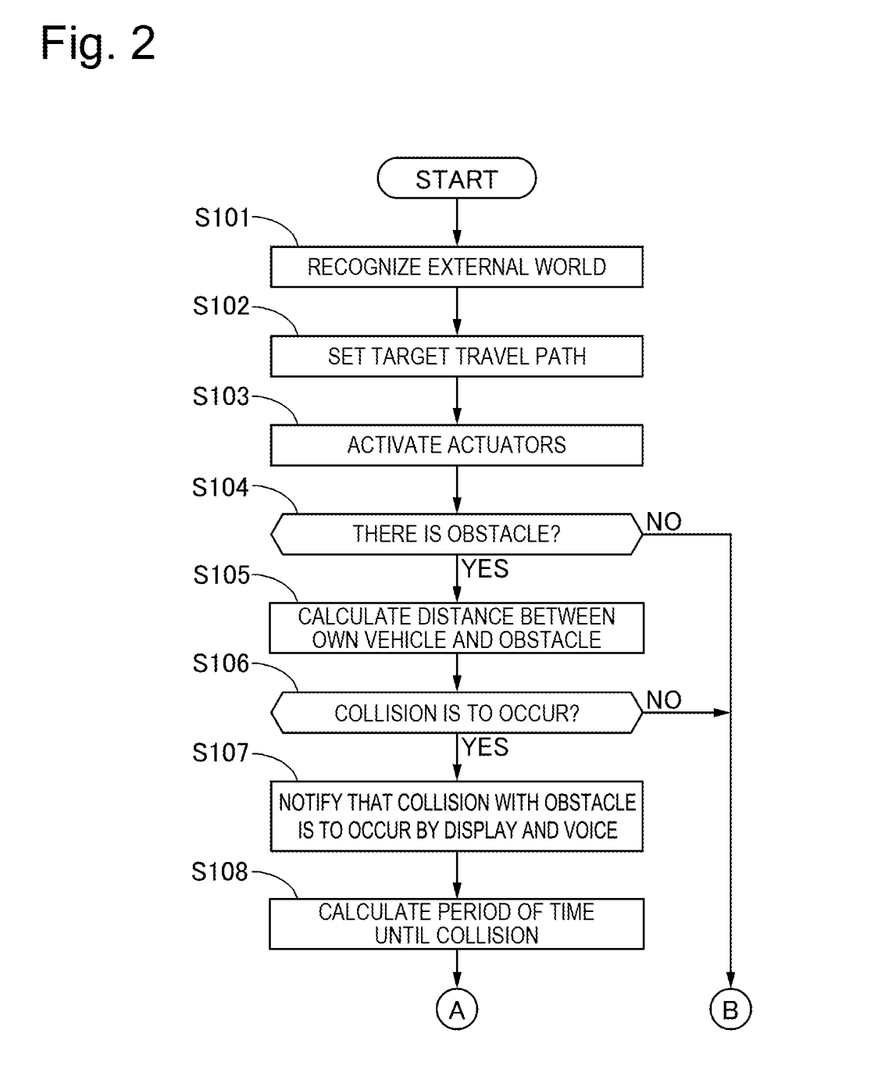
FIG. 2 is a flowchart for illustrating a flow of driving assist control according to the first embodiment.
Figure 3:
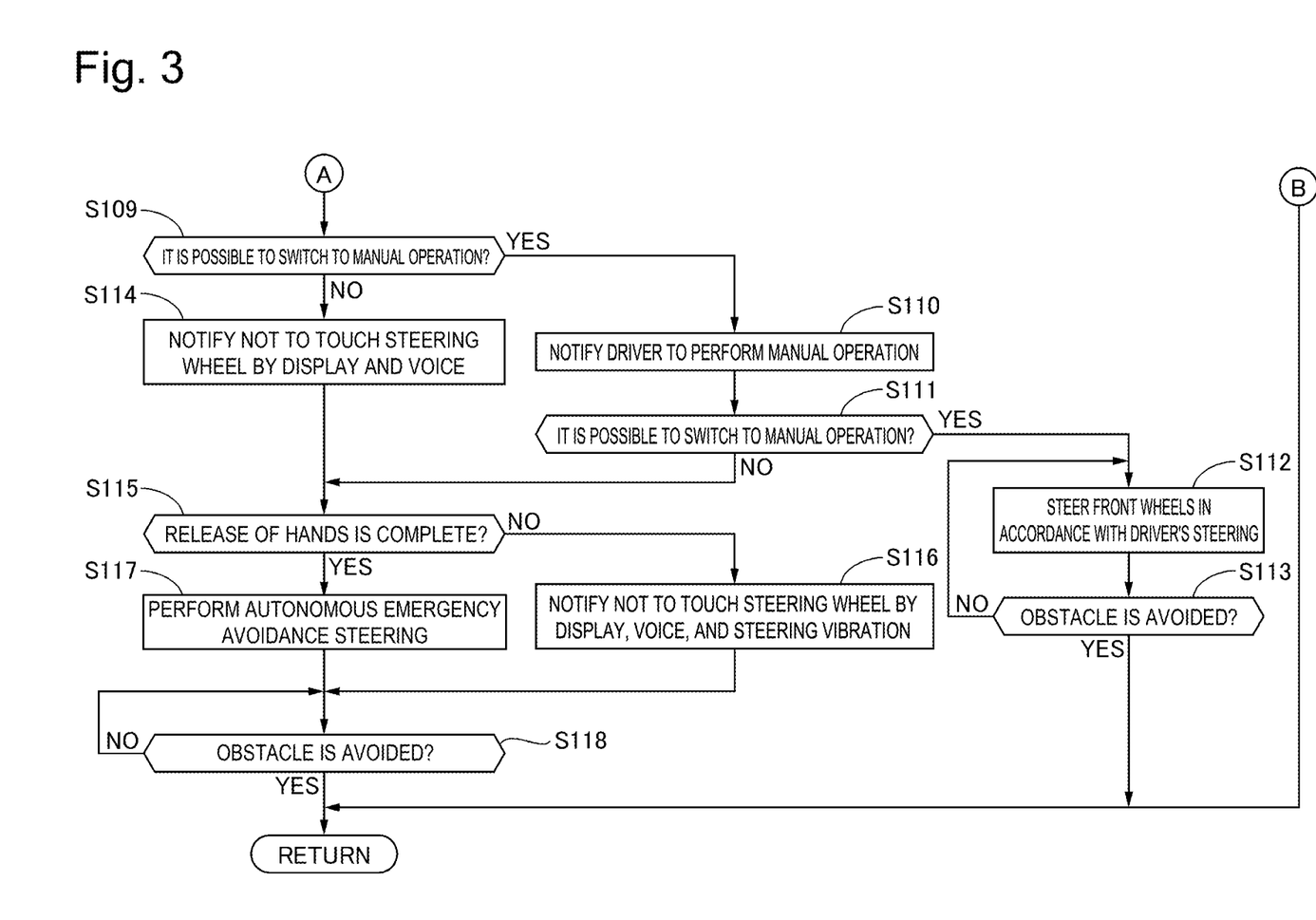
FIG. 3 is a flowchart for illustrating a flow of the driving assist control according to the first embodiment.

FIG. 2 and FIG. 3 are flowcharts for illustrating a flow of the driving assist control in the first embodiment.

In Step S101, the external world recognition device 1 acquires and recognizes external world information (for example, road shape, white lines, and own vehicle position).

In Step S102, the target travel path is set based on the recognized external world information and the destination set by the driver.

In Step S103, each actuator (electric power steering device 8, engine 9, and braking system 10) is driven such that the own vehicle travels along the target travel path.

In Step S104, it is determined whether or not the external world recognition device 1 has found an obstacle on the target travel path ahead. When the determination is "YES", the process advances to Step S105, and when the determination is "NO", the process advances to "RETURN".

In Step S105, the distance between the own vehicle and the obstacle is calculated from the position of the own vehicle and the position of the obstacle.

In Step S106, it is determined whether or not the own vehicle is to collide with the obstacle based on, for example, the distance between the own vehicle and the obstacle and the vehicle speed of the own vehicle. When the determination is "YES", the process advances to Step S107, and when the determination is "NO", the process advances to "RETURN".

In Step S107, the driver is notified that the vehicle is to collide with the obstacle by display on the HUD device 11, voice output from the voice utterance device 12, and warning sound output from the warning device 13. A display (touch panel) of the navigation system 2 or a lamp of an instrument panel may be used for the notification by display.

In Step S108, a period of time until the collision with the obstacle is calculated by referring to a collision prediction map set in advance in accordance with the distance between the own vehicle and the obstacle and the vehicle speed of the own vehicle.

In Step S109, it is determined whether or not switching to manual operation by the driver can be executed based on whether or not there is sufficient time for the driver to respond until the collision with the obstacle. When the determination is "YES", the process advances to Step S110, and when the determination is "NO", the process advances to Step S114. In this step, it is determined that there is sufficient time for the driver to respond until the collision with the obstacle when the period of time until the collision with the obstacle is longer than a threshold value.

In Step S110, a command (second notification command) is output to the HUD device 11, the voice utterance device 12, and the warning device 13 so as to give to the driver a notification for urging the driver to avoid the obstacle by manual operation.

In Step S111, it is determined whether or not the switch to manual operation has been completed between the start of the notification in Step S110 and elapse of a first predetermined time. When the determination is "YES", the process advances to Step S112, and when the determination is "NO", the process advances to Step S115. In this step, it is determined that the switch to manual operation has been completed when the steering touch sensor 16 detects that the driver is holding the steering wheel.

In Step S112, an avoidance operation mode for avoiding the obstacle transitions to a driver avoidance steering mode. The driver avoidance steering mode is a mode in which the front wheels are steered in accordance with the steering angle of the steering wheel manually operated by the driver. In the driver avoidance steering mode, the electric power steering device 8 operates as a conventional electric power steering device assisting the steering by the driver.

In Step S113, it is determined whether the obstacle has been avoided. When the determination is "YES", the process advances to "RETURN", and when the determination is "NO", the process returns to Step S112.

In Step S114, a command (first notification command) is output to the HUD device 11, the voice utterance device 12, and the warning device 13 so as to give to the driver a notification for urging the driver to avoid touching the steering wheel.

In Step S115, the steering touch sensor 16 determines whether or not the driver released his or her hands from the steering wheel between the start of notification in Step S114 and elapse of a second predetermined time. When the determination is "YES", the process advances to Step S117, and when the determination is "NO", the process advances to Step S116.

In Step S116, a command (first notification command) is output to the HUD device 11, the voice utterance device 12, the warning device 13, and the steering vibration device 14 so as to give to the driver a notification for urging the driver to avoid touching the steering wheel. Here, the steering wheel is caused to vibrate in a non-continuous manner or together with a warning sound.

In Step S117, the avoidance operation mode for avoiding the obstacle transitions to the autonomous emergency avoidance steering mode. In the autonomous emergency avoidance steering mode, autonomous emergency avoidance steering control is performed. In the autonomous emergency avoidance steering control, a target travel path along which the own vehicle is to travel toward the escape zone is set based on the obstacle position (first position information) and the own vehicle position (second position information), and the electric power steering device 8 is driven such that the own vehicle travels autonomously along the target travel path.

In Step S118, it is determined whether the obstacle has been avoided. When the determination is "YES", the process advances to "RETURN", and when the determination is "NO", the process returns to Step S117.

Next, the actions and effects of the first embodiment are described.

The vehicle control controller 4 of the first embodiment acquires information on an obstacle in front of the own vehicle acquired by the external world recognition device 1, and based on the acquired obstacle position and own vehicle position, outputs a first notification command for controlling the notification unit 15 so as to give to the driver a notification for urging the driver to avoid touching the steering wheel when transitioning to the autonomous emergency avoidance steering mode for avoiding the obstacle based on control by the electric power steering device 8 (Step S114 and Step S116). Hitherto, the driver is only notified before the autonomous emergency avoidance steering is executed, but in the first embodiment, the driver is notified to avoid touching the steering wheel before the autonomous emergency avoidance steering is executed, and as a result, it is possible to prevent the autonomous emergency avoidance steering from being executed under a state in which the driver is touching the steering wheel. As a result, it is possible to prevent the driver from interfering with the autonomous emergency avoidance steering.

The vehicle control controller 4 acquires the target travel path of the own vehicle determined based on the external world information acquired by the external world recognition device 1, executes the driving assist control of controlling the electric power steering device 8, the engine 9, and the braking system 10 of the own vehicle such that the own vehicle travels along the target travel path, and outputs the first notification command when transitioning to the autonomous emergency avoidance steering mode under the state in which the driving assist control is being executed. As a result, it is possible to prevent the driver from interfering with the autonomous emergency avoidance steering for obstacles that appear during the driving assist control.

The first notification command includes a command for controlling the notification unit 15 (steering vibration device 14) in order to give a vibratory notification of applying vibrations to the steering wheel (Step S116). As a result, when the driver is holding the steering wheel, it is easier for the driver to reflexively release his or her hands due to the transmission of information felt by the driver through the skin by vibrations. Therefore, release by the driver of his or her hands from the steering wheel can be promoted, and the driver can be prevented from interfering with the autonomous emergency avoidance steering.

The first notification command includes a command for controlling the notification unit 15 (HUD device 11, voice utterance device 12, and warning device 13) in order to give a visual notification or an aural notification to the driver (Step S116). Through giving of a visual notification or an aural notification in addition to the vibratory notification, release by the driver of his or her hands from the steering wheel can be further promoted.

The first notification command is a command for controlling the notification unit 15 (steering vibration device 14 and warning device 13) by giving the vibratory notification together with a warning sound as the aural notification. Through giving of the vibratory notification and the aural notification together, the drives notices the notification more easily, and therefore release by the driver of his or her hands from the steering wheel can be further promoted.

The first notification command is an example of controlling the notification unit 15 (steering vibration device 14, voice utterance device 12, and warning device 13) in order to give the vibratory notification and the warning sound and the voice notification as the aural notification. Through giving of the notification by voice, the driver can more accurately recognize the content of the notification, and therefore release by the driver of his or her hands from the steering wheel can be further promoted.

The first notification command is a command for controlling the notification unit 15 (steering vibration device 14) in order to give the vibratory notification in a non-continuous manner. When it is assumed that the vibratory notification is given continuously, the vibratory notification may be erroneously recognized as road noise, and the notification may not be noticed. Therefore, by giving the vibratory notification in a non-continuous manner, it is possible to suppress false recognition as road noise, and it is possible to further promote release by the driver of his or her hands from the steering wheel.

The vehicle control controller 4 outputs, as the first notification command, a command for controlling the notification unit 15 (HUD device 11, voice utterance device 12, and warning device 13) in order to give a visual notification or an aural notification to the driver, and a command for controlling the notification unit 15 (steering vibration device 14) in order to give a vibratory notification of applying vibrations to the steering wheel when the steering wheel is being touched after a predetermined time has elapsed. Through giving of the notification in two steps, in which the second step is a stronger notification (is more easily noticed by the driver) than the first step, release by the driver of his or her hands from the steering wheel can be further promoted.

The vehicle control controller 4 selects, when the driving assist control is being executed, as an avoidance operation mode for the obstacle, any one of the autonomous emergency avoidance steering mode and the driver avoidance steering mode of avoiding the obstacle by operation of the steering wheel by the driver based on the obstacle position and the own vehicle position, outputs the first notification command for controlling the notification unit 15 when the avoidance operation mode is the autonomous emergency avoidance steering mode, and outputs the second notification command for controlling the notification unit 15 different from the first notification command when the avoidance operation mode is the driver avoidance steering mode. That is, by giving different notifications in the autonomous emergency avoidance steering mode and the driver avoidance steering mode, it is possible to more reliably notify the driver of which of the autonomous emergency avoidance steering mode or the driver avoidance steering mode the avoidance operation mode is to transition to.

The first notification command is a command for controlling the notification unit 15 (steering vibration device 14) in order to giving a vibratory notification of applying vibrations to the steering wheel, and the second notification command is a command for controlling the notification unit 15 (HUD device 11, voice utterance device 12, and warning device 13) in order to give a visual notification or an aural notification to the driver. Here, in a case in which the driver is holding and operating the steering wheel, when the steering wheel is vibrated, the driver may accidentally release his or her hands due to the upset caused by the vibrations. Therefore, when transitioning to the driver avoidance steering mode, by not executing the vibratory notification, it is possible to prevent the driver from accidentally releasing his or her hands from the steering wheel.

The vehicle control controller 4 outputs the first notification command when the avoidance operation mode has not transitioned to the driver avoidance steering mode after the second notification command is output. As a result, when the driver does not notice the notification, or when it becomes impossible to avoid the obstacle by the manual operation by the driver, the driver can be notified that the driver avoidance steering mode is to be canceled to transition to the autonomous emergency avoidance steering mode. Thus, release by the driver of his or her hands from the steering wheel can be further promoted.

Other Embodiments

The embodiment of the present invention has been described above. However, the specific configuration of the present invention is not limited to the configuration described in the embodiment. A change in design without departing from the scope of the gist of the invention is also encompassed in the present invention.

The present invention exerts a particularly remarkable effect when applied to a vehicle equipped with a steering device in which the steering wheel and (the steering mechanism of) the front wheels are mechanically coupled. However, the present invention is also applicable to a vehicle equipped with a so-called steering-by-wire steering device, in which the steering wheel and the front wheels are mechanically separated, and the same actions and effects as those of the embodiment can be exhibited.

In the embodiment, there is described an example in which the first notification command for controlling the notification unit so as to give to the driver a notification for urging the driver to avoid touching the steering wheel is output when transitioning to the autonomous emergency avoidance steering mode under a state in which driving assist control is being executed. However, the first notification command for controlling the notification unit so as to give to the driver a notification for urging the driver to avoid touching the steering wheel may be output when transitioning to the autonomous emergency avoidance steering mode under a state in which driving assist control is not being executed.

Technical ideas which may be obtained from the embodiment described above are described below.

According to one aspect of the present invention, there is provided a vehicle control device including a control unit arranged in a vehicle which includes a notification unit configured to give a notification to a driver of the vehicle, wherein the control unit is configured to: perform calculation based on input information, and to output a calculated result to the notification unit; acquire information on an obstacle in front of the vehicle, which is acquired by an external world recognition unit; and output a first notification command for controlling the notification unit so as to give to the driver a notification for urging the driver to avoid touching the steering wheel when transitioning to an autonomous emergency avoidance steering mode for avoiding the obstacle by controlling a steering actuator of the vehicle based on acquired first position information on a position of the obstacle and second position information on a position of the vehicle.

According to a more preferred aspect of the present invention, in the above-mentioned aspect, the control unit is configured to: acquire a target travel path along which the vehicle is to travel, which is determined based on external world information acquired from the external world recognition unit; execute driving assist control of controlling a drive actuator, a braking actuator, and the steering actuator of the vehicle so that the vehicle travels along the target travel path; and output, under a state in which the driving assist control is being executed, the first notification command when transitioning to the autonomous emergency avoidance steering mode.

According to another preferred aspect of the present invention, in any one of the above-mentioned aspects, the first notification command includes a command for controlling the notification unit in order to give a vibratory notification of applying vibrations to the steering wheel.

According to yet another preferred aspect of the present invention, in any one of the above-mentioned aspects, the first notification command includes a command for controlling the notification unit in order to give a visual notification or an aural notification to the driver.

According to still another preferred aspect of the present invention, in any one of the above-mentioned aspects, the first notification command is a command for controlling the notification unit in order to give the vibratory notification together with a warning sound as the aural notification.

According to still another preferred aspect of the present invention, in any one of the above-mentioned aspects, the first notification command is a command for controlling the notification unit in order to give the vibratory notification, and a warning sound and a voice notification as the aural notification.

According to still another preferred aspect of the present invention, in any one of the above-mentioned aspects, the first notification command is a command for controlling the notification unit in order to give the vibratory notification in a non-continuous manner.

According to still another preferred aspect of the present invention, in any one of the above-mentioned aspects, the control unit is configured to output as the first notification command: a command for controlling the notification unit in order to give a visual notification or an aural notification to the driver; and a command for controlling the notification unit in order to give a vibratory notification of applying vibrations to the steering wheel when the driver is touching the steering wheel after a predetermined period of time has elapsed.

According to still another preferred aspect of the present invention, in any one of the above-mentioned aspects, the control unit is configured to: select, when the driving assist control is being executed, as an avoidance operation mode for the obstacle, any one of the autonomous emergency avoidance steering mode and a driver avoidance steering mode of avoiding the obstacle by operation of the steering wheel by the driver, based on the first position information and the second position information; output the first notification command for controlling the notification unit when the avoidance operation mode is the autonomous emergency avoidance steering mode; and output a second notification command for controlling the notification unit different from the first notification command when the avoidance operation mode is the driver avoidance steering mode.

According to still another preferred aspect of the present invention, in any one of the above-mentioned aspects, the first notification command is a command for controlling the notification unit in order to give a vibratory notification of applying vibrations to the steering wheel, and the second notification command is a command for controlling the notification unit in order to give a visual notification or an aural notification to the driver.

According to still another preferred aspect of the present invention, in any one of the above-mentioned aspects, the control unit is configured to output the first notification command when the avoidance operation mode has not transitioned to the driver avoidance steering mode after the second notification command is output.

Further, from another viewpoint, according to an aspect of the present invention, there is provided a vehicle control device including a control unit arranged in a vehicle which includes a notification unit configured to give a notification to a driver of the vehicle, wherein the control unit is configured to: perform calculation based on input information, and to output a calculated result to the notification unit; acquire information on an obstacle in front of the vehicle, which is acquired by an external world recognition unit; select, as an avoidance operation mode for the obstacle, any one of an autonomous emergency avoidance steering mode of avoiding the obstacle by control of a steering actuator of the vehicle and a driver avoidance steering mode of avoiding the obstacle by operation of the steering wheel by the driver, based on acquired first position information on a position of the obstacle and second position information on a position of the vehicle; output a first notification command for controlling the notification unit when the avoidance operation mode is the autonomous emergency avoidance steering mode; and output a second notification command for controlling the notification unit different from the first notification command when the avoidance operation mode is the driver avoidance steering mode.

Preferably, in the above-mentioned aspect, the control unit is configured to: acquire a target travel path along which the vehicle is to travel, which is determined based on the external world information acquired from the external world recognition unit; execute driving assist control of controlling a drive actuator, a braking actuator, and the steering actuator of the vehicle so that the vehicle travels along the target travel path; and select, under a state in which the driving assist control is being executed, as an avoidance operation mode for the obstacle, any one of the autonomous emergency avoidance steering mode and the driver avoidance steering mode.

According to another preferred aspect of the present invention, in any one of the above-mentioned aspects, the first notification command is a command for controlling the notification unit in order to give a vibratory notification of applying vibrations to the steering wheel, and the second notification command is a command for controlling the notification unit in order to give a visual notification or an aural notification to the driver.

From yet another viewpoint, according to an aspect of the present invention, there is provided a vehicle control method for a vehicle which includes a notification unit configured to give a notification to a driver of the vehicle, the vehicle control method including: acquiring information on an obstacle in front of the vehicle, which is acquired by an external world recognition unit; and outputting a first notification command for controlling the notification unit so as to give to the driver a notification for urging the driver to avoid touching the steering wheel when transitioning to an autonomous emergency avoidance steering mode for avoiding the obstacle by controlling a steering actuator of the vehicle, based on acquired first position information on a position of the obstacle and second position information on a position of the vehicle.

Preferably, in the above-mentioned aspect, the vehicle control method further includes: acquiring a target travel path along which the vehicle is to travel, which is determined based on external world information acquired from the external world recognition unit; executing driving assist control of controlling a drive actuator, a braking actuator, and the steering actuator of the vehicle so that the vehicle travels along the target travel path; and outputting, under a state in which the driving assist control is being executed, the first notification command when transitioning to the autonomous emergency avoidance steering mode.

From yet another viewpoint, according to an aspect of the present invention, there is provided a vehicle control system including: a notification unit configured to give a notification to a driver of a vehicle; an external world recognition unit configured to acquire external world information on the vehicle; a steering actuator of the vehicle; and a control unit, wherein the control unit is configured to: acquire information on an obstacle in front of the vehicle, which is acquired by the external world recognition unit; and output a first notification command for controlling the notification unit so as to give to the driver a notification for urging the driver to avoid touching the steering wheel when transitioning to an autonomous emergency avoidance steering mode for avoiding the obstacle by controlling the steering actuator, based on acquired first position information on a position of the obstacle and second position information on a position of the vehicle.

Preferably, in the above-mentioned aspect, the vehicle control system further includes a drive actuator of the vehicle; and a braking actuator of the vehicle, and the control unit is configured to: acquire a target travel path along which the vehicle is to travel, which is determined based on the external world information acquired from the external world recognition unit; execute driving assist control of controlling the drive actuator, the braking actuator, and the steering actuator so that the vehicle travels along the target travel path; and output, under a state in which the driving assist control is being executed, the first notification command when transitioning to the autonomous emergency avoidance steering mode.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-100370 filed on May 29, 2019. All disclosed contents including Specification, Scope of Claims, Drawings, and Abstract of Japanese Patent Application No. 2019-100370 filed on May 29, 2019 are incorporated herein by reference in their entirety.

REFERENCE SIGNS LIST

1 external world recognition device (external world recognition unit), 4 vehicle control controller (control unit), 8 electric power steering device (steering actuator), 9 engine (drive actuator), 10 brake system (braking actuator), 15 notification unit

The invention claimed is:
1. A vehicle control device, comprising a control unit arranged in a vehicle which includes a notification unit configured to give a notification to a driver of the vehicle,
wherein the control unit is configured to:
perform calculation based on input information, and to output a calculated result to the notification unit;

acquire information on an obstacle in front of the vehicle, which is acquired by an external world recognition unit; and output a first notification command for controlling the notification unit so as to give to the driver a notification for urging the driver to avoid touching a steering wheel when transitioning to an autonomous emergency avoidance steering mode for avoiding the obstacle by controlling a steering actuator of the vehicle, based on acquired first position information on a position of the obstacle and second position information on a position of the vehicle, wherein the control unit is configured to output, as the first notification command:

a command for controlling the notification unit in order to give a visual notification or an aural notification to the driver; and a command for controlling the notification unit in order to give a vibratory notification of applying vibrations to the steering wheel when the driver is touching the steering wheel after a predetermined period of time has elapsed.

2. The vehicle control device according to claim 1, wherein the control unit is configured to:

acquire a target travel path along which the vehicle is to travel, which is determined based on external world information acquired from the external world recognition unit;

execute driving assist control of controlling a drive actuator, a braking actuator, and the steering actuator of the vehicle so that the vehicle travels along the target travel path; and output, under a state in which the driving assist control is being executed, the first notification command when transitioning to the autonomous emergency avoidance steering mode.

3. The vehicle control device according to claim 1, wherein the first notification command is a command for controlling the notification unit in order to give the vibratory notification together with a warning sound as the aural notification.

4. The vehicle control device according to claim 1, wherein the first notification command is a command for controlling the notification unit in order to give the vibratory notification, and a warning sound and a voice notification as the aural notification.

5. The vehicle control device according to claim 1, wherein the first notification command is a command for controlling the notification unit in order to give the vibratory notification in a non-continuous manner.

6. The vehicle control device according to claim 1, wherein the control unit is configured to:

select, when driving assist control is being executed, as an avoidance operation mode for the obstacle, any one of the autonomous emergency avoidance steering mode and a driver avoidance steering mode of avoiding the obstacle by operation of the steering wheel by the driver, based on the first position information and the second position information;

output the first notification command for controlling the notification unit when the avoidance operation mode is the autonomous emergency avoidance steering mode; and output a second notification command for controlling the notification unit different from the first notification command when the avoidance operation mode is the driver avoidance steering mode.

7. The vehicle control device according to claim 6, wherein the first notification command is a command for controlling the notification unit in order to give a vibratory notification of applying vibrations to the steering wheel, and wherein the second notification command is a command for controlling the notification unit in order to give a visual notification or an aural notification to the driver.

8. The vehicle control device according to claim 6, wherein the control unit is configured to output the first notification command when the avoidance operation mode has not transitioned to the driver avoidance steering mode after the second notification command is output.

9. A vehicle control method for a vehicle which includes a notification unit configured to give a notification to a driver of the vehicle and includes a control unit, the vehicle control method comprising:

acquiring, using the control unit, information on an obstacle in front of the vehicle, which is acquired by an external world recognition unit;

outputting, using the control unit, a first notification command for controlling the notification unit so as to give to the driver a notification for urging the driver to avoid touching a steering wheel when transitioning to an autonomous emergency avoidance steering mode for avoiding the obstacle by controlling a steering actuator of the vehicle, based on acquired first position information on a position of the obstacle and second position information on a position of the vehicle, and wherein the outputting of the first notification command includes outputting:

a command for controlling the notification unit in order to give a visual notification or an aural notification to the driver; and a command for controlling the notification unit in order to give a vibratory notification of applying vibrations to the steering wheel when the driver is touching the steering wheel after a predetermined period of time has elapsed.

10. The vehicle control method according to claim 9, further comprising:

acquiring a target travel path along which the vehicle is to travel, which is determined based on external world information acquired from the external world recognition unit;

executing driving assist control of controlling a drive actuator, a braking actuator, and the steering actuator of the vehicle so that the vehicle travels along the target travel path; and outputting, under a state in which the driving assist control is being executed, the first notification command when transitioning to the autonomous emergency avoidance steering mode.

11. A vehicle control system, comprising:

a notification unit configured to give a notification to a driver of a vehicle;

an external world recognition unit configured to acquire external world information on the vehicle;

a steering actuator of the vehicle; and a control unit, wherein the control unit is configured to:

acquire information on an obstacle in front of the vehicle, which is acquired by the external world recognition unit; and output a first notification command for controlling the notification unit so as to give to the driver a notification for urging the driver to avoid touching a steering wheel when transitioning to an autonomous emergency avoidance steering mode for avoiding the obstacle by controlling the steering actuator, based on acquired first position information on a position of the obstacle and second position information on a position of the vehicle, wherein the control unit is configured to output, as the first notification command:
    a command for controlling the notification unit in order to give a visual notification or an aural notification to the driver; and
    a command for controlling the notification unit in order to give a vibratory notification of applying vibrations to the steering wheel when the driver is touching the steering wheel after a predetermined period of time has elapsed.

12. The vehicle control system according to claim 11, further comprising:
    a drive actuator of the vehicle; and
    a braking actuator of the vehicle,
    wherein the control unit is configured to:
        acquire a target travel path along which the vehicle is to travel, which is determined based on the external world information acquired from the external world recognition unit;
        execute driving assist control of controlling the drive actuator, the braking actuator, and the steering actuator so that the vehicle travels along the target travel path; and
        output, under a state in which the driving assist control is being executed, the first notification command when transitioning to the autonomous emergency avoidance steering mode.

* * * * *